(12) United States Patent
Zhou et al.

(10) Patent No.: US 12,122,489 B1
(45) Date of Patent: Oct. 22, 2024

(54) OCEAN OBSERVATION PLATFORM INTEGRATED WITH HIGHLY RELIABLE WAVE ENERGY GENERATION MECHANISM AND WORKING METHOD THEREOF

(71) Applicant: SOUTH CHINA UNIVERSITY OF TECHNOLOGY, Guangzhou (CN)

(72) Inventors: Binzhen Zhou, Guangzhou (CN); Xu Huang, Guangzhou (CN); Peng Jin, Guangzhou (CN); Zhi Zheng, Guangzhou (CN); Lei Wang, Guangzhou (CN); Hengming Zhang, Guangzhou (CN); Chusen Lin, Guangzhou (CN); Hongjie Wen, Guangzhou (CN)

(73) Assignee: SOUTH CHINA UNIVERSITY OF TECHNOLOGY, Guangzhou (CN)

( * ) Notice: Subject to any disclaimer, the term of this patent is extended or adjusted under 35 U.S.C. 154(b) by 0 days.

(21) Appl. No.: 18/419,512

(22) Filed: Jan. 22, 2024

(30) Foreign Application Priority Data

Oct. 31, 2023 (CN) .......................... 202311423009.9

(51) Int. Cl.
```
B63B 35/44      (2006.01)
B63B 39/10      (2006.01)
F03B 13/14      (2006.01)
```

(52) U.S. Cl.
CPC .............. *B63B 35/44* (2013.01); *B63B 39/10* (2013.01); *F03B 13/14* (2013.01); *B63B 2035/4466* (2013.01); *B63B 2039/105* (2013.01); *F05B 2240/93* (2013.01)

(58) Field of Classification Search
CPC . B63B 35/44; B63B 39/10; B63B 2035/4466; B63B 2039/105; F03B 13/14; F05B 2240/93
See application file for complete search history.

(56) References Cited

U.S. PATENT DOCUMENTS

| | | | | |
|---|---|---|---|---|
| 4,248,044 A * | 2/1981 | Woodilla | ............... | F03B 13/142 60/497 |
| 8,013,462 B2 * | 9/2011 | Protter | .................... | F03B 13/16 290/53 |
| 9,322,388 B2 * | 4/2016 | Hayashi | .................. | F03B 13/20 |

(Continued)

FOREIGN PATENT DOCUMENTS

| | | |
|---|---|---|
| CN | 104110347 A | 10/2014 |
| CN | 104832363 A | 8/2015 |
| CN | 107917039 A | 4/2018 |

(Continued)

*Primary Examiner* — Janine M Kreck

(57) ABSTRACT

This invention presents an ocean observation platform with an integrated, highly reliable wave energy generation mechanism, relevant to power supply technology in marine environments. It includes a platform floating body and a power generation mechanism located at the platform's bottom. The mechanism features disassemblable power generation piles, arranged in a circular array on the floating body. This design ensures that if one pile fails, the others continue generating electricity, enabling a long-term, stable, and continuous power supply. This is particularly useful for monitoring meteorological, temperature, salinity, and ocean current data in complex marine conditions.

11 Claims, 5 Drawing Sheets

(56) References Cited

U.S. PATENT DOCUMENTS

2016/0003213 A1    1/2016  Yu et al.
2017/0085213 A1    3/2017  Petrin et al.

FOREIGN PATENT DOCUMENTS

| CN | 108054827 A | 5/2018 |
| CN | 111532382 A | 8/2020 |
| CN | 112606957 A | 4/2021 |
| DE | 10102023 A1 | 7/2002 |

* cited by examiner

OCEAN OBSERVATION PLATFORM INTEGRATED WITH HIGHLY RELIABLE WAVE ENERGY GENERATION MECHANISM AND WORKING METHOD THEREOF

TECHNICAL FIELD

The invention relates to the field of power supply technology of ocean observation platforms, in particular to an ocean observation platform integrated with a highly reliable wave energy generation mechanism and working method thereof.

BACKGROUND ART

With the horizontal and vertical development of human development activities in the marine field, higher requirements are put forward for multi-directional and multi-objective observation and high-precision prediction of the deep-sea marine environment. Among them, offshore observation platforms equipped with various marine environmental parameter measurement equipment have been widely used, the offshore observation platform provides important support for marine environmental observation and forecasting, and provides important guarantees for the development of far-reaching sea resources, marine transportation, and marine disaster prevention and mitigation.

However, it is limited by the loading of the observation platform, the complex and changeable deep-sea environment, and the difficulty of maintaining deep-sea equipment. The traditional power supply mode of offshore observation platforms based on diesel motors and solar energy plus battery can not meet the long-term stable power supply demand of deep sea exploration. Therefore, a new type of power energy supply method is urgently needed for the deep sea observation platform.

At present, wave energy observation platforms have been proposed, such as:

CN201711369487.0 discloses a fully enclosed inertial point-suction wave energy device, which includes a float, a mechanical system, a permanent magnet linear generator, an electronic control module, and a mooring device. The float is a fully enclosed type, which is used to capture the energy of the wave and convert the kinetic energy and potential energy of the wave into the mechanical energy of the float swing movement. The mechanical system converts the mechanical energy of the float swing movement into the mechanical energy of the linear oscillation movement of the mass block and the transmission shaft, the permanent magnet linear generator connects the drive shaft and the mass block, and converts the mechanical energy of the oscillating movement of the mass block and the drive shaft into electrical energy. The invention overcomes the shortcomings of the oscillating buoy wave energy power generation device, it has a unique configuration, controllable system oscillation frequency, strong environmental adaptability, and high energy conversion efficiency. It effectively solves the problem of seawater corrosion resistance of the wave energy device, the system is highly reliable, is convenient for installation and maintenance on sea and land, and has low production and construction costs with a wide application prospect.

However, it can be seen that the existing power supply mode lacks the setting of a backup power supply structure, and the reliability is low, which can not meet the needs of deep sea ocean observation.

SUMMARY

In order to solve the above problems, the invention provides an ocean observation platform integrated with a highly reliable wave energy generation mechanism and working method thereof, by setting up multiple power generation piles, the remaining power generation piles can be used to generate electricity when one of the power generation piles fails, so as to realize long-term, stable and continuous power supply for meteorology, temperature, salt, ocean current and so on in complex marine environment.

In order to achieve the above purpose, the invention provides an ocean observation platform integrated with a highly reliable wave energy generation mechanism, including a platform floating body and a power generation mechanism set at a bottom of the platform floating body, the power generation mechanism includes power generation piles that can be disassembled and set on the platform floating body, and the power generation piles are uniformly arranged on the platform floating body in a circular array.

Preferably, each power generation pile includes a sealing shell with a detachable connection between a top and the platform floating body, and a motor shaft with an axial sliding connection between an upper end and a lower end through a sloshing spring and an inside of the sealing shell, an outer wall of the motor shaft is fixed with a gravity block and a linear generator in turn, the sloshing spring at a bottom is connected to a float after passing through the sealing shell, and the float is also in an axial sealing and sliding connection with the bottom of the sealing shell.

Preferably, the invention also includes an ocean state adaptation mechanism, the ocean state adaptation mechanism includes an observation station set at a top of the platform floating body and a mode adjustment unit set inside the power generation pile, the mode adjustment unit includes a regulating rod with one end aligned to the motor shaft and sleeved inside the sloshing spring, and the other end of the regulating rod is connected to a drive motor through a ball screw.

Preferably, the observation station includes a detachable support seat set at the top of the platform floating body, a support frame fixed at a top of the support seat, an observation platform fixed at a top of the support frame, and an observation unit set at a top of the observation platform, the observation unit includes an integrated meteorological instrument, a beacon light, a Beidou positioning system, a wind speed and direction meter, and an ocean current meter; photovoltaic panels are fixed around the support frame.

Preferably, an electric storage mechanism is also arranged inside the sealing shell and near an end of the float, and the electric storage mechanism is electrically connected to the linear generator and a photovoltaic panel respectively.

Preferably, installation wells are set on the platform floating body and corresponding to positions of the power generation piles, and a top of the power generation pile passes through the installation well and is detachable by bolts to the platform floating body;

the power generation pile is fixed with a handle through the top of the platform floating body.

Preferably, an outer wall of the sealing shell is also fixed with two layers of reinforcing rings, and an axial reinforcing rod is fixed between the two layers of reinforcing rings.

The working method of a highly reliable ocean observation platform includes the following steps:

determining a working state of the power generation piles by an acquisition signal of the observation unit, the working state of the power generation pile includes a normal working state and a protection state;

in the normal working state, driving the float to sway by a wave of the ocean, driving the motor shaft to move axially by an axial sway of the float, thus driving the linear generator to generate electricity;

in the protection state, starting the drive motor, and driving the regulating rod by the ball screw to move in a straight line, so that the regulating rod is turned out from an inside of the sloshing spring until it is tightened to avoid a shaking of the motor shaft.

Preferably, a method for determining the working state of the power generation pile is as follows:

The method for determining the working state of the piles is as follows:

when a freak wave occurs in the ocean, the power generation piles are in a protection state, otherwise, they are in a normal working state;

wherein the freak wave satisfies the following conditions: a maximum wave height $H_m$ is two times larger than an effective wave height $H_s$.

Preferably, the design of the linear generator is as follows:
The anti-magnetic force equation of the linear generator is as follows:

$$F = 3\pi \frac{\lambda_y i_q + (L_d - L_q) i_d i_q}{2\tau}$$

in the formula, $\lambda_y$ is a permanent magnet flux linkage of the linear generator, $i_d$, $i_q$ are currents of the d-axis and q-axis of the linear generator respectively, and $L_d$, $L_q$ are an inductance of the d-axis and an inductance of the q-axis of the linear generator respectively, $\tau$ is a polar distance of the linear generator;

an anti-magnetic force of the linear generator satisfies the following equation:

$F = -D\dot{x} - Jx$ in the formula, D is a damping coefficient of an active component, J is an elastic coefficient of a reactive component, $\dot{x}$ is a speed of movement, x is a displacement of movement;

therefore, a movement response equation is obtained:

$(M+A)\ddot{x} + (B+D)\dot{x} + (K+J)x = F_d$ in the formula, M is a total mass of the power generation piles, A is an additional mass, $\ddot{x}$ is an acceleration of the movement, B is a radiation damping, K is a coefficient, and $K = \rho gs$, $\rho$ is a density of the water, g is an acceleration of the gravity, s is a cross-sectional area of the floating body, and $F_d$ is a force generated by a incident wave acting on the platform floating body;

when D=B, the optimal power is achieved, at this time:

$$\omega(M + A) = \frac{K + J}{\omega}$$

in the formula, $\omega$ is a frequency of the linear generator; the elastic coefficient of the anti-magnetic force of the linear generator is as follows:

$J = \omega^2(M+A) - K$

The invention has the following beneficial effects:

1. By setting up the power generation piles, the remaining power generation piles can be used to generate electricity when one of the power generation piles fails, so as to realize the long-term, stable, and continuous power supply for meteorology, temperature, salt, and ocean current in the complex marine environment.

2. Through the observation results of the observation station, the working mode of the power generation pile is adjusted to reduce the damage to the power generation pile under extreme conditions, so as to adapt to different sea conditions;

3. The detachable settings of the platform floating body, the observation station, and the power generation pile are easy for transportation;

4. The setting of the sealing shell isolates the wave energy conversion module and the complex marine environment, and improves the operation safety system.

The following is a further detailed description of the technical solution of the invention through drawings and an embodiment.

Figure 1:
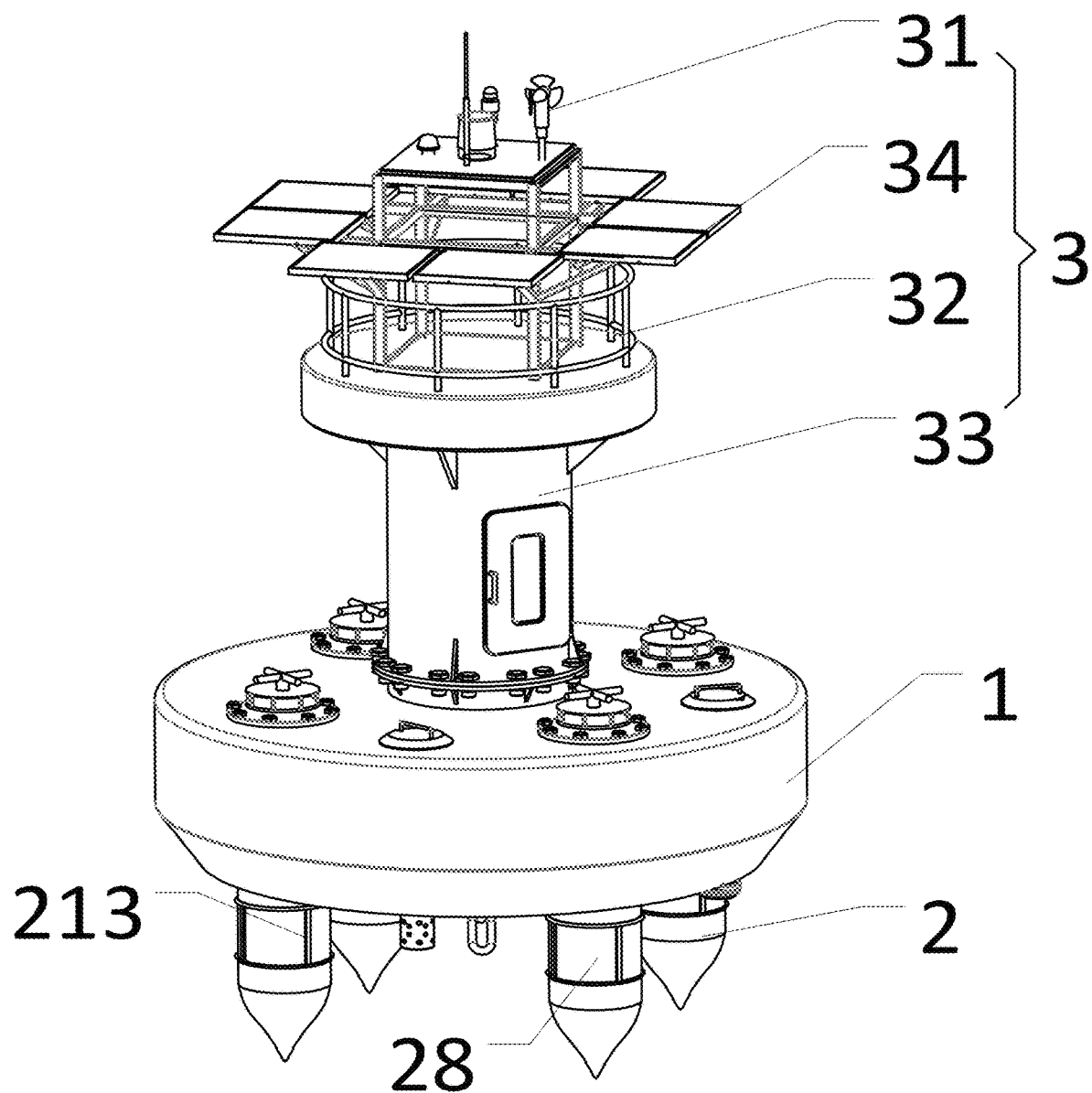
FIG. 1 is an overall structure diagram of the ocean observation platform integrated with a highly reliable wave energy generation mechanism described in the invention.

Among them:

1, platform floating body; 11, installation wells; 12, hanging anchor hook;

2, power generation pile; 21, sealing shell; 22, sloshing spring; 23, motor shaft; 24, gravity block; 25, linear generator; 26, electric storage mechanism; 27, handle; 28, reinforcing ring; 29, float; 210, regulating rod; 211, ball screw; 212, drive motor; 213, axial reinforcing rod;

3, observation station; 31, observation unit; 32, support frame; 33, support seat; 34, photovoltaic panel.

DETAILED DESCRIPTION OF THE EMBODIMENTS

In order to make the purpose, technical solution, and advantages of the disclosure of the implementation cases of the invention clear, the following is a detailed description in combination with the attached figures and an embodiment. It should be understood that the specific embodiment described here is only used to explain the embodiment of the invention, which is not used to limit the embodiments of the invention. Based on the embodiment in this application, all other embodiments obtained by ordinary technical personnel in this field without making creative work belong to the scope of protection in this application. Examples of the embodiment are shown in the accompanying figures, where the same or similar labels from beginning to end represent the same or similar components or components with the same or similar functions.

It should be noted that the terms 'include' and 'comprise' and any deformation of them are intended to cover non-exclusive inclusion, for example, a process, method, system, product, or server that contains a series of steps or units need not be limited to those steps or units that are clearly listed, but may include other steps or units that are not clearly listed or are inherent to those processes, methods, products or equipment.

Similar labels and letters represent similar items in the following figures. Therefore, once an item is defined in a figure, it does not need to be further defined and explained in the subsequent figures.

In the description of the invention, it is necessary to explain that the orientation or positional relationship indicated by the terms 'up', 'down', 'inside', 'outside', etc. is based on the orientation or positional relationship shown in the attached figures, or is the orientation or positional relationship that is habitually placed when the invention product is used, only to facilitate the description of the invention and simplify the description, rather than to indicate or imply that the device or component referred to must have a specific orientation, be constructed and operated in a specific orientation, and therefore cannot be understood as a limitation to the invention.

In the description of the invention, it is also necessary to explain that, unless otherwise clearly defined and limited, the terms 'set', 'install', and 'connect' should be understood in a broad sense, for example, it can be fixed connection, detachable connection, or integrated connection; it can be mechanical connection or electrical connection; it can be directly connected or indirectly connected through an intermediate medium, or can be the internal connection of two components. For ordinary technicians in this field, the specific meaning of the above terms in this invention can be understood in detail.

Figure 2:
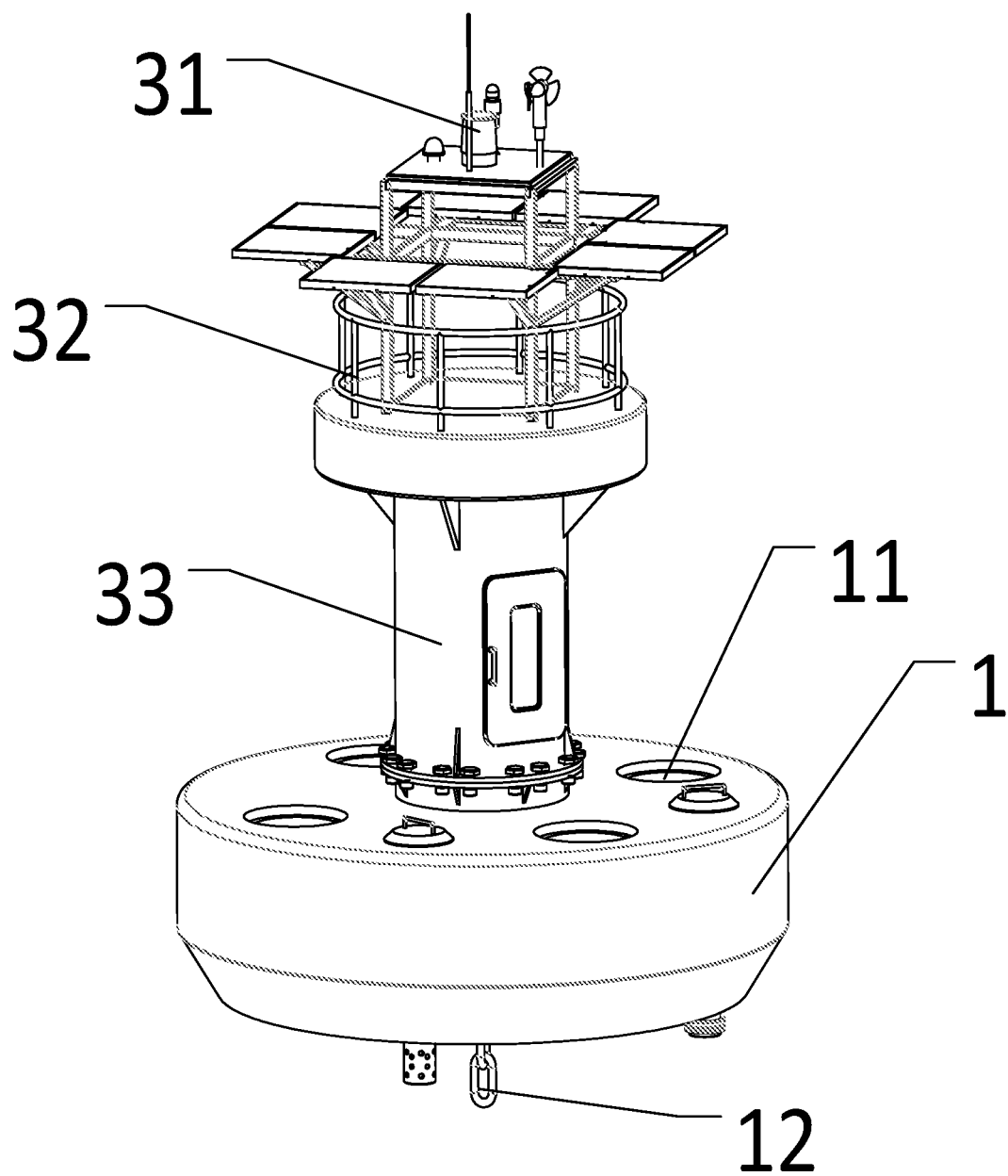
FIG. 2 is a partial structure diagram of the ocean observation platform integrated with a highly reliable wave energy generation mechanism described in the invention.
Figure 3:
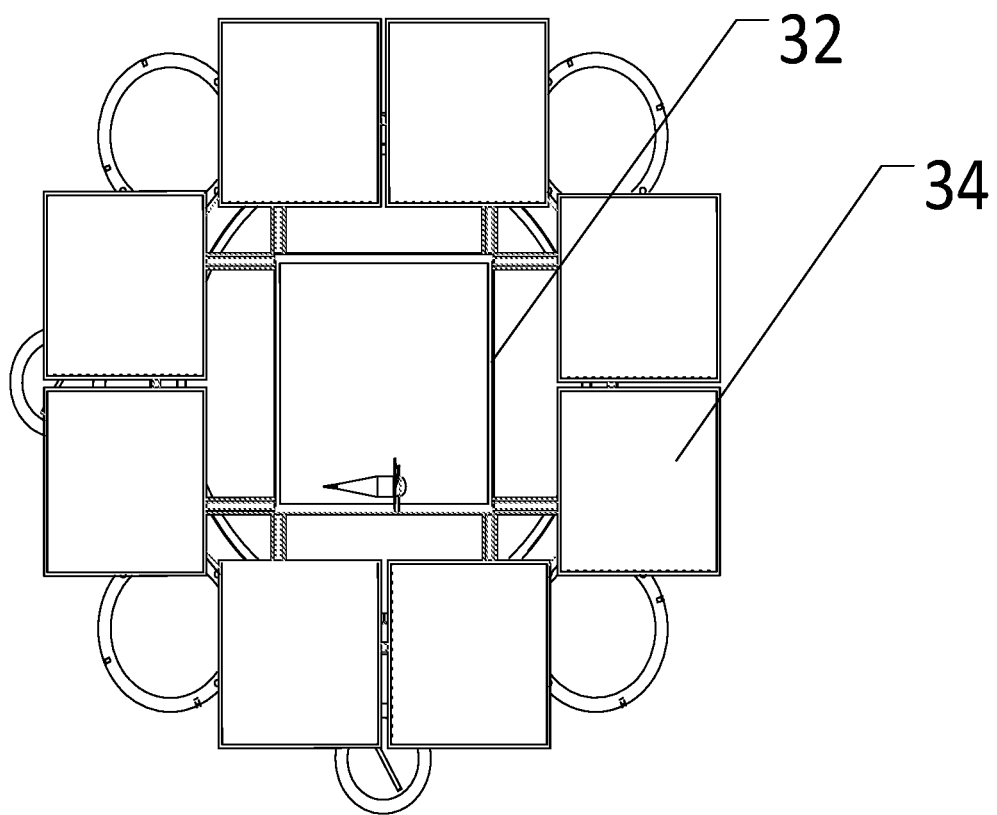
FIG. 3 is a top view of the ocean observation platform integrated with a highly reliable wave energy generation mechanism described in the invention.
Figure 4:
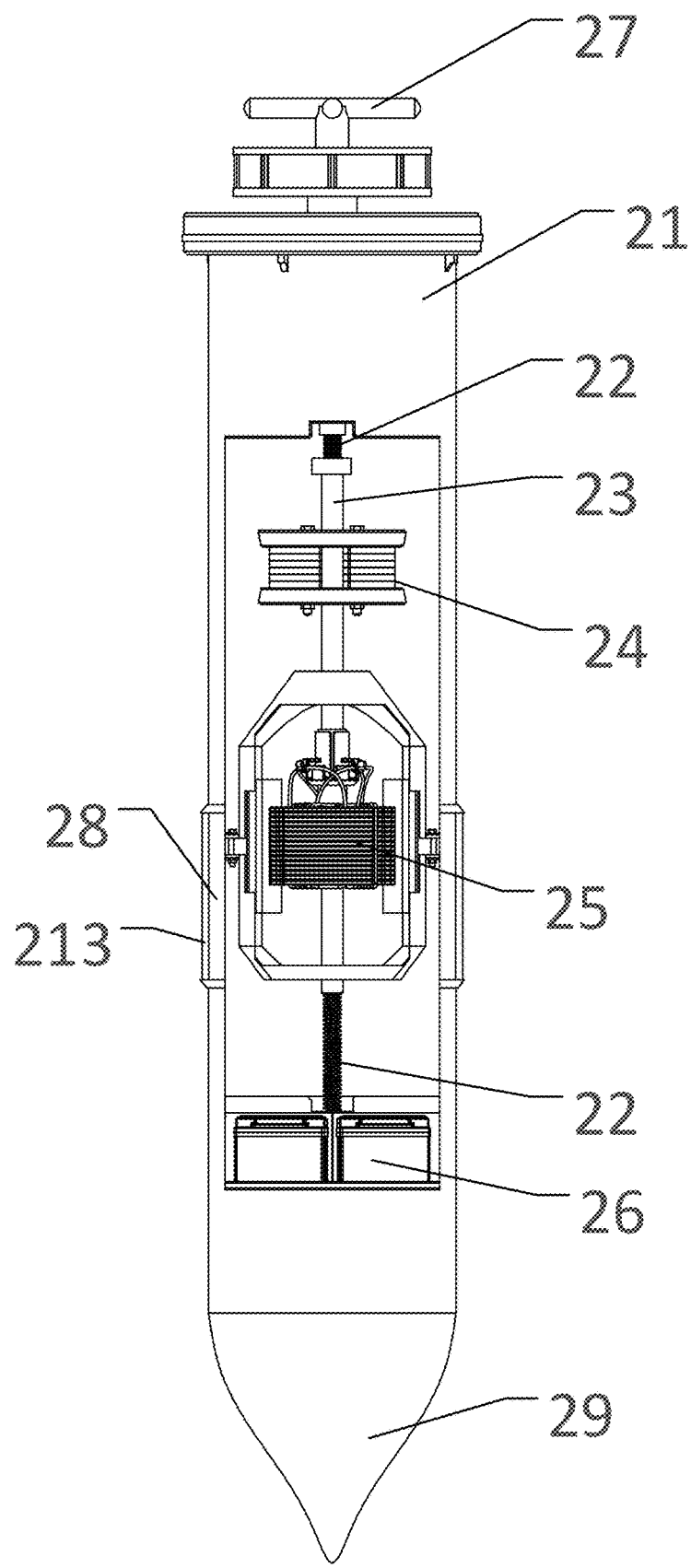
FIG. 4 is a structural diagram of the power generation pile of the ocean observation platform integrated with a highly reliable wave energy generation mechanism described in the invention.
Figure 5:
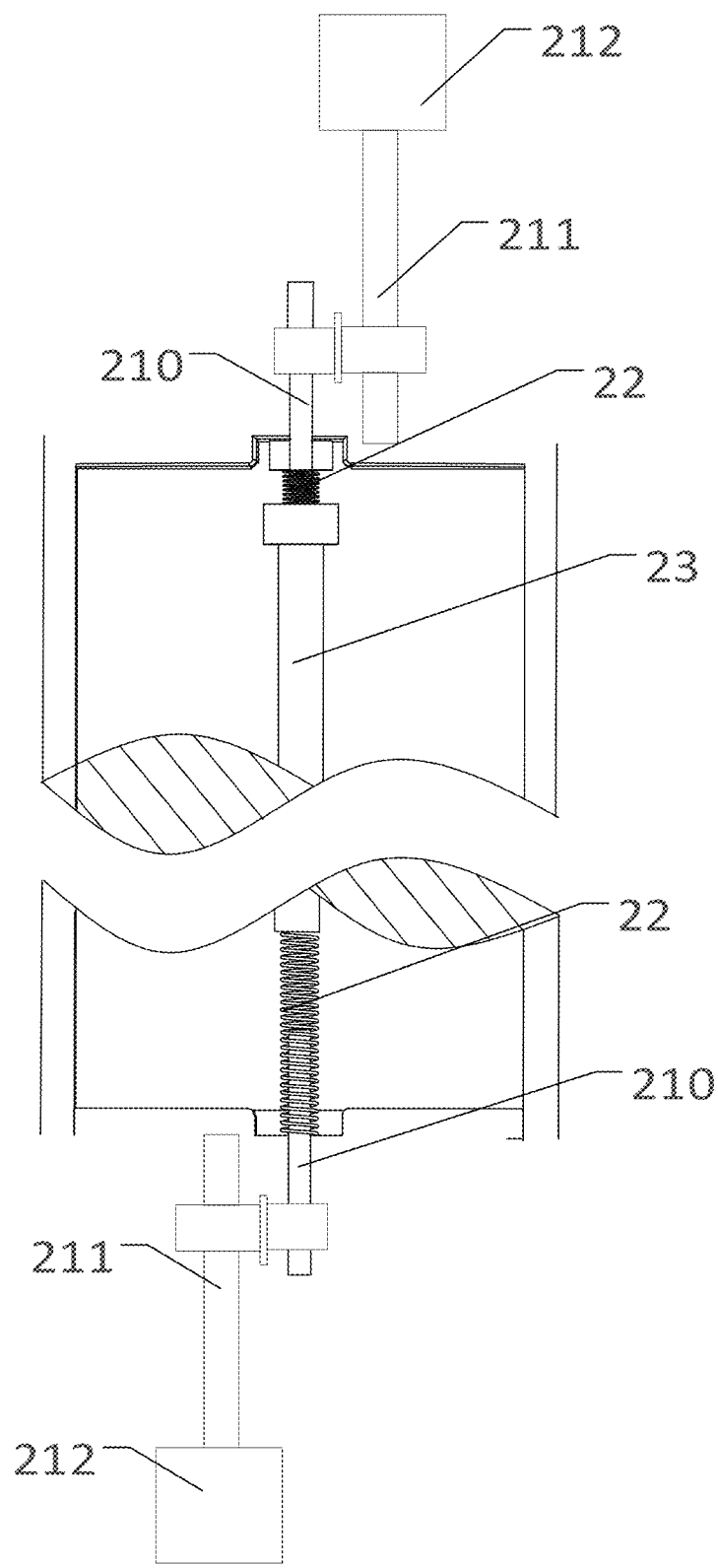
FIG. 5 is a structural diagram of the mode control unit of the ocean observation platform integrated with a highly reliable wave energy generation mechanism described in the invention.

As shown in FIGS. 1-5, an ocean observation platform integrated with a highly reliable wave energy generation mechanism, including a platform floating body 1 and a power generation mechanism set at the bottom of the platform floating body 1, the power generation mechanism includes power generation piles 2 that can be disassembled and set on the platform floating body 1, and the power generation piles 2 are uniformly arranged on the platform floating body 1 in a circular array. An anchor hook 12 is also arranged at the bottom of the platform floating body 1 in this embodiment.

Specifically, each power generation pile 2 includes a sealing shell 21 with a detachable connection between the top and the platform floating body 1, and a motor shaft 23 with an axial sliding connection between the upper end and the lower end through a sloshing spring 22 and the inside of the sealing shell 21, the outer wall of the motor shaft 23 is fixed with a gravity block 24 and a linear generator 25 in turn, the sloshing spring 22 at the bottom is connected to a float 29 after passing through the sealing shell 21, and the float 29 is also in an axial sealing and sliding connection with the bottom of the sealing shell 21.

Preferably, the invention also includes an ocean state adaptation mechanism, the ocean state adaptation mechanism includes an observation station 3 set at the top of the platform floating body 1 and a mode adjustment unit set inside the power generation pile 2, the mode adjustment unit includes a regulating rod 210 with one end aligned to the motor shaft 23 and sleeved inside the sloshing spring 22, and the other end of the regulating rod 210 is connected to a drive motor 212 through a ball screw 211.

Preferably, the observation station 3 includes a detachable support seat 33 set at the top of the platform floating body 1, a support frame 32 fixed at the top of the support seat 33, an observation platform fixed at a top of the support frame 32, and an observation unit 31 set at the top of the observation platform, the observation unit 31 includes an integrated meteorological instrument, a beacon light, a Beidou positioning system, a wind speed and direction meter, and an ocean current meter; a lightning rod is also set on the observation platform in this embodiment.

The photovoltaic panels 34 are fixed around the support frame 32.

Preferably, an electric storage mechanism 26 is also arranged inside the sealing shell 21 and near the end of the float 29, and the electric storage mechanism 26 is electrically connected with the linear generator 25 and the photovoltaic panel 34 respectively.

Preferably, installation wells 11 are set on the platform floating body 1 and corresponding to positions of the power generation piles 2, and the top of the power generation pile 2 passes through the installation well 11 and is detachable by bolts to the platform floating body 1;

the power generation pile 2 is fixed with a handle 27 through the top of the platform floating body 1, which is convenient for disassembly and hoisting.

Preferably, the outer wall of the sealing shell 21 is also fixed with two layers of reinforcing rings 28, and the axial reinforcing rod 213 is fixed between the two layers of reinforcing rings 28, which increases the overall strength and structural stability of the power generation pile 2.

The working method of a highly reliable ocean observation platform includes the following steps:
the acquisition signal of the observation unit 31 determines the working state of the power generation piles 2, the working state of the power generation pile 2 includes a normal working state and a protection state;
in the normal working state (normal sea conditions, at this time, the state of the marine environment is detected to meet the working conditions of power generation piles 2), the wave of the ocean drives the float 29 to sway, the axial sway of the float 29 drives the motor shaft 23 to move axially, thus driving the linear generator 25 to generate electricity;
in the protection state (harsh sea conditions), the drive motor 212 starts, and the ball screw 211 drives the regulating rod 210 to move in a straight line, so that the regulating rod 210 is turned out from an inside of the sloshing spring 22 until it is tightened to avoid the shaking of the motor shaft 23.

Preferably, the method for determining the working state of the power generation pile 2 is as follows:

The method for determining the working state of the piles is as follows:
when a freak wave occurs in the ocean, the power generation piles 2 are in the protection state, otherwise it is in the normal working state;
wherein the freak wave satisfies the following conditions:
a maximum wave height $H_m$ is two times larger than an effective wave height $H_s$.

Preferably, the design of the linear generator 25 is as follows:

The anti-magnetic force equation of the linear generator 25 is as follows:

$$F = 3\pi \frac{\lambda_y i_q + (L_d - L_q) i_d i_q}{2\tau}$$

in the formula, $\lambda_y$ is a permanent magnet flux linkage of the linear generator 25, $i_d$, $i_q$ are currents of the d-axis and q-axis of the linear generator 25 respectively, and $L_d$, $L_q$ are an inductance of the d-axis and an inductance of the q-axis of the linear generator 25 respectively, τ is a polar distance of the linear generator 25;

the anti-magnetic force of the linear generator 25 satisfies the following equation:

$$F=-D\dot{x}-Jx$$

in the formula, D is a damping coefficient of an active component, J is an elastic coefficient of a reactive component, $\dot{x}$ is a speed of movement, x is a displacement of movement;

therefore, the movement response equation is obtained:

$$(M+A)\ddot{x}+(B+D)\dot{x}+(K+J)x=F_d$$

in the formula, M is a total mass of the power generation piles 2, A is an additional mass, $\ddot{x}$ is an acceleration of the movement, B is a radiation damping, K is a coefficient, and K=ρgs, ρ is a density of the water, g is an acceleration of the gravity, s is a cross-sectional area of the floating body, and $F_d$ is a force generated by an incident wave acting on the platform floating body 1; when D=B, the optimal power is achieved, at this time:

$$\omega(M+A) = \frac{K+J}{\omega}$$

in the formula, ω is a frequency of the linear generator 25; the elastic coefficient of the anti-magnetic force of the linear generator 25 is as follows:

$$J=\omega^2(M+A)-K$$

Therefore, the invention adopts the above-mentioned ocean observation platform and working method integrated with a high-reliability wave energy power generation mechanism. By setting multiple power generation piles 2, when one of the power generation piles 2 fails, the remaining other power generation piles 2 can be used to generate electricity, thus realizing a long-term, stable, and continuous power supply for meteorology, temperature, and salt, and ocean currents in a complex marine environment.

Finally, it should be noted that the above embodiment is only used to explain the technical solution of the invention rather than to restrict it. Although the invention is described in detail concerning the better embodiment, ordinary technicians in this field should understand that they can still modify or replace the technical solution of the invention, and these modifications or equivalent replacements cannot make the modified technical solution out of the spirit and scope of the technical solution of the invention.

What is claimed is:

1. An ocean observation platform integrated with a highly reliable wave energy generation mechanism, including a platform floating body and a power generation mechanism set at a bottom of the platform floating body, wherein:

the power generation mechanism includes power generation piles that can be disassembled and set on the platform floating body, and the power generation piles are uniformly arranged on the platform floating body in a circular array;

each power generation pile includes a sealing shell with a detachable connection between a top and the platform floating body, and a motor shaft with an axial sliding connection between an upper end and a lower end through a sloshing spring and an inside of the sealing shell wherein, an outer wall of the motor shaft is fixed with a gravity block and a linear generator in turn, the sloshing spring at a bottom is connected to a float after passing through the sealing shell, and the float is also in an axial sealing and sliding connection with the bottom of the sealing shell;

the float and the gravity block constitute a resonant system, in which a mass of the float and its damping in water are a set of resonant structures; a mass of the gravity block and damping provided by the sloshing spring are another set of resonant structures; and the ocean observation station also includes an ocean state adaptation mechanism, the ocean state adaptation mechanism includes an observation station set at a top of the platform floating body and a mode adjustment unit set inside the power generation pile, the mode adjustment unit includes a regulating rod with one end aligned to the motor shaft and sleeved inside the sloshing spring, and the other end of the regulating rod is connected to a drive motor through a ball screw.

2. The ocean observation platform integrated with the highly reliable wave energy generation mechanism according to claim 1, wherein the observation station includes:

a detachable support seat set at the top of the platform floating body;

a support frame fixed at a top of the support seat;

an observation platform fixed at a top of the support frame;

an observation unit set at a top of the observation platform wherein, the observation unit includes an integrated meteorological instrument, a beacon light, a Beidou positioning system, a wind speed and direction meter, and an ocean current meter; and photovoltaic panels are fixed around the support frame.

3. The ocean observation platform integrated with the highly reliable wave energy generation mechanism according to claim 2, wherein an electric storage mechanism is also arranged inside the sealing shell and near an end of the float, and the electric storage mechanism is electrically connected with the linear generator and the photovoltaic panel respectively.

4. The working method of the ocean observation platform integrated with the highly reliable wave energy generation mechanism according to claim 3 includes the following steps:

determining a working state of the power generation piles by an acquisition signal of an observation unit in the observation station, wherein the working state of the power generation pile includes a normal working state and a protection state, wherein:

in the normal working state, the power generation piles are configured for driving the float to sway by a wave of the ocean, driving the motor shaft to move axially by an axial sway of the float, thus driving the linear generator to generate electricity; and in the protection state, the power generation piles are configured for starting the drive motor, and driving the regulating rod by the ball screw to move in a straight line, so that the regulating rod is turned out from an inside of the sloshing spring until it is tightened to avoid a shaking of the motor shaft.

5. The ocean observation platform integrated with the highly reliable wave energy generation mechanism according to claim 2, wherein:

installation wells are set on the platform floating body and corresponding to positions of the power generation piles, and a top of the power generation pile passes through the installation well and is detachable by bolts to the platform floating body; and the power generation pile is fixed with a handle through the top of the platform floating body.

6. The working method of the ocean observation platform integrated with the highly reliable wave energy generation mechanism according to claim 5 includes the following steps:

determining a working state of the power generation piles by an acquisition signal of an observation unit in the observation station, wherein the working state of the power generation pile includes a normal working state and a protection state, wherein:

in the normal working state, the power generation piles are configured for driving the float to sway by a wave of the ocean, driving the motor shaft to move axially by an axial sway of the float, thus driving the linear generator to generate electricity; and in the protection state, the power generation piles are configured for starting the drive motor, and driving the regulating rod by the ball screw to move in a straight line, so that the regulating rod is turned out from an inside of the sloshing spring until it is tightened to avoid a shaking of the motor shaft.

7. The working method of the ocean observation platform integrated with the highly reliable wave energy generation mechanism according to claim 2 includes the following steps:

determining a working state of the power generation piles by an acquisition signal of the observation unit in the observation station, wherein the working state of the power generation pile includes a normal working state and a protection state, wherein:

in the normal working state, the power generation piles are configured for driving the float to sway by a wave of the ocean, driving the motor shaft to move axially by an axial sway of the float, thus driving the linear generator to generate electricity; and in the protection state, the power generation piles are configured for starting the drive motor, and driving the regulating rod by the ball screw to move in a straight line, so that the regulating rod is turned out from an inside of the sloshing spring until it is tightened to avoid a shaking of the motor shaft.

8. The ocean observation platform integrated with the highly reliable wave energy generation mechanism according to claim 1, wherein an outer wall of the sealing shell is also fixed with two layers of reinforcing rings, and an axial reinforcing rod is fixed between the two layers of reinforcing rings.

9. The working method of the ocean observation platform integrated with the highly reliable wave energy generation mechanism according to claim 8 includes the following steps:

determining a working state of the power generation piles by an acquisition signal of an observation unit in the observation station, wherein the working state of the power generation pile includes a normal working state and a protection state, wherein:

in the normal working state, the power generation piles are configured for driving the float to sway by a wave of the ocean, driving the motor shaft to move axially by an axial sway of the float, thus driving the linear generator to generate electricity; and in the protection state, the power generation piles are configured for starting the drive motor, and driving the regulating rod by the ball screw to move in a straight line, so that the regulating rod is turned out from an inside of the sloshing spring until it is tightened to avoid a shaking of the motor shaft.

10. The working method of the ocean observation platform integrated with the highly reliable wave energy generation mechanism according to claim 1 includes the following steps:

determining a working state of the power generation piles by an acquisition signal of an observation unit in the observation station, wherein the working state of the power generation pile includes a normal working state and a protection state, wherein:

in the normal working state, the power generation piles are configured for driving the float to sway by a wave of the ocean, driving the motor shaft to move axially by an axial sway of the float, thus driving the linear generator to generate electricity; and in the protection state, the power generation piles are configured for starting the drive motor, and driving the regulating rod by the ball screw to move in a straight line, so that the regulating rod is turned out from an inside of the sloshing spring until it is tightened to avoid a shaking of the motor shaft.

11. The working method of the ocean observation platform integrated with the highly reliable wave energy generation mechanism according to claim 10, wherein a method for determining the working state of the power generation pile is as follows:

when a freak wave occurs in the ocean, the power generation piles are in the protection state, otherwise they are in the normal working state, wherein the freak wave satisfies the following condition:

a maximum wave height $H_m$ is two times larger than an effective wave height $H_s$.

* * * * *